United States Patent Office
3,738,996
Patented June 12, 1973

3,738,996
PROCESS FOR THE PREPARATION OF QUATERNARY IMIDAZOLINE DERIVATIVES
Michael Bloch, Salmunster, Germany, and Adolph Koebner, St. Bees, Cumberland, England, assignors to Rewo Chemische Fabrik G.m.b.H., Steinau, Kreis Schluchtern, Germany
No Drawing. Filed Dec. 21, 1971, Ser. No. 210,543
Claims priority, application Germany, Dec. 23, 1970, P 20 63 424.6
Int. Cl. C07d 49/34
U.S. Cl. 260—309.6          8 Claims

ABSTRACT OF THE DISCLOSURE

Quaternary imidazoline derivatives are prepared in high yield by quaternizing a basic tertiary imidazoline with a halogen-substituted aliphatic organic carboxylic or sulfonic acid or a sultone, at a temperature within the range of 40° C. to 90° C., under mildly alkaline conditions, by adding alkali if necessary at such a rate as to maintain the pH of the reaction mixture at a value such that samples thereof diluted with water to 10%-solids fall within the pH range of 7–9, and preferably 7 to 7.5, any remaining amount of the predetermined amount of alkali being added subsequently without regard to its effect upon the pH value, but the reaction being continued within the aforesaid temperature range until a constant pH value is attained. In this way under optimum conditions yields even in excess of 90% can frequently be secured.

---

This invention relates to a process for the preparation of quaternary imidazoline derivatives.

BACKGROUND OF THE INVENTION

The amphoteric derivatives of substituted imidazolines derived from fatty acids and other fat derivatives are widely and increasingly used as surface-active agents; their advantages over other types of surface active agents include their usually complete biodegradability, their relative mildness to the skin, their good foaming properties, and their complete miscibility with cationic, anionic and non-ionic surface-active agents, resulting from their amphoteric nature.

Typical of the substituted imidazolines whose amphoteric derivatives are today used as surface-active agents, as discussed above, are those substituted imidazolines which are represented by the formula

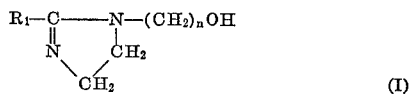

(I)

in which $R_1$ represents a saturated or unsaturated straight- or branched-chain hydrocarbon radical with 7 to 21 carbon atoms, and $n$ is 2, 3 or 4.

These substituted imidazolines of General Formula I above are conventionally prepared by first condensing fatty acids or fatty acid esters with diamines of the formula $H_2N$—$CH_2$—$CH_2$—$NH$—$(CH_2)_n$—$OH$. Afterwards, the resultant condensate is converted to the desired amphoteric derivative by quaternization with a halogen-substituted carboxylic or halogen-substituted sulfonic acid or a sultone. As described for instance in Mannheimer's U.S. Pat. No. 2,528,378, one mixes 286 parts by weight of substituted imidazoline within the General Formula I above with an aqueous solution containing 90 parts of caustic soda and 96 parts of monochloroacetic acid in 300 parts of water. The substituted imidazoline and the monochloroacetic acid are present in equimolar proportions and the mixture is initially strongly alkaline (pH approximately 13) but the pH falls during the reaction. When the reaction has reached the state where the pH of the mixture no longer changes on continued heating, a further 25 parts of caustic soda dissolved in 21 parts of water are added, and heating is continued to maintain the reaction mixture at about 95° C. for an additional hour.

Unfortunately however this type of quaternization reaction only converts at most about 60% of the tertiary substituted imidazoline of Formula I into the desired quaternized amphoteric derivative, so that larger amounts of unreacted tertiary substituted imidazoline remain in the quaternization product, and equally there is also an excess of monochloroacetic acid (as the sodium salt) which reacts to form sodium chloride and sodium glycolate, because salts of monochloroacetic acid and other similar halogenated aliphatic carboxylic acids are rapidly hydrolysed in aqueous solution at high temperature and under conditions of high pH, while salts of halogenated aliphatic sulfonic acids are also hydrolysed under such conditions, albeit more slowly. The presence of unreacted tertiary substituted imidazoline is certainly detrimental, while the presence of sodium glycolate and sodium chloride is also frequently undesirable in the finished product. Furthermore, under the very alkaline reaction conditions prevailing in the reaction mixture the substituted imidazolines themselves are liable to undergo partial hydrolysis, producing a secondary base—namely an hydroxy-ethyl-amino-ethylamide of a fatty acid—as a side reaction product, which will not undergo quaternization.

Thus it will be seen that the classical procedures for quaternizing a tertiary substituted imidazoline of Formula I above with a halogen-substituted aliphatic carboxylic or sulfonic acid or sultone under the conditions described above are unsatisfactory, since the reaction does not go to completion. This is undesirable firstly because the yield of the desired quaternized amphoteric imidazoline derivatives is reduced, while secondly, side-reaction products are produced which are detrimental or at least unwanted, and thirdly and most importantly, a quantity of the unquaternized substituted imidazoline used as starting material remains behind in the product, which product therefore is irritant to the skin and eyes.

As would be expected, it is possible to obtain a higher percentage conversion of the substituted imidazoline into the desired amphoteric imidazoline derivative if a large excess of quaternizing agent is employed; but then the excess of quaternizing agent which is not used up in the reaction gets hydrolysed, in the way previously described, to form, in the presence of alkali, the salt of a hydroxy-acid and a metallic halide. Unless removed from the finished product, these—especially when present in substantial amounts—can cause troublesome effects, particularly when the product is mixed with other surface active agents. For instance, in liquid preparations the presence of salts will usually raise the cloud point of the composition, and may even promote separation into phases. It is therefore usually desirable to remove such hydrolysis products but this involves a separate purification process, such as for example, that described in Mannheimer's U.S. patent specification No. 3,359,275.

OBJECTS OF THE INVENTION

It is the object of the present invention to provide a process which will achieve the quaternization of a high percentage of the tertiary substituted imidazoline used as starting material, thereby securing a product which is milder to the skin and eyes because of the reduced content of unreacted tertiary substituted imidazoline remaining in the finished product; it is a further object of the invention to achieve this even when using a halogen-substituted aliphatic carboxylic or sulfonic acid as the quaternizing agent, without the necessity for using a large excess of quaternizing agent.

BRIEF SUMMARY OF THE INVENTION

According to the invention there is provided a process for the preparation of amphoteric quaternary imidazoline derivatives, useful as surface-active agents, in which a tertiary amine selected from the group consisting of substituted tertiary imidazolines and mixtures thereof, said substituted tertiary imidazolines being those which are represented by the formula

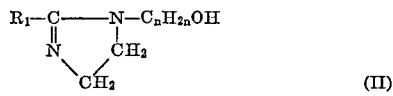
(II)

(wherein $R_1$ is a radical selected from the group consisting of hydrocarbon, monohydroxy-substituted hydrocarbon and dihydroxy-substituted hydrocarbon radicals, all containing from 7 to 21 carbon atoms, while $n$ is an integer of from 2 to 4)

is reacted with a quaternizing agent selected from the group consisting of halogenated materials and sultones and mixtures thereof, said halogenated materials consisting of the group of halogenated acids represented by the formula $$C_mH_{2m-p}(OH)_p(Z)X \qquad (III)$$

(where $m$ is an integer of from 1 to 3, $p$ is selected from the group consisting of zero and integers from 1 to the value of $m$, Z is selected from the group consisting of Cl, Br and I, and X is selected from the group consisting of $SO_3H$ and COOH) and their sodium, potassium, lithium, magnesium, calcium, aluminum and zinc salts, and said sultones being selected from the group consisting of compounds represented by the formulae

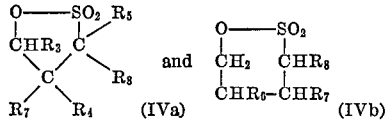
(IVa)    (IVb)

(wherein one of the substituents $R_3$, $R_4$ and $R_5$ is selected from the group consisting of H and $CH_3$, and the other two said substituents are H, while the substituents $R_6$, $R_7$ and $R_8$ are each selected from the group consisting of H and OH)

said reaction being effected in aqueous solution between 1 molar proportion of said substituted imidazoline and 0.3 to 3.0 molar proportions of said quaternizing agent at a temperature of between 40° C. and 90° C.

with addition of from 0 to 3.5 molar proportions of an alkali selected from the group consisting of sodium hydroxide, potassium hydroxide, lithium hydroxide, and mixtures thereof, the addition of alkali from the outset being so controlled that the pH of the reaction mixture remains at a value such that samples thereof diluted with deionized water to bring the total solids content thereof to substantially 10% have a pH within the range of from 7 to 9, said control of the alkali addition being continued until there has been quaternized at least 50% of that amount of said imidazoline derivative to react with which sufficient quaternizing agent is present, the temperature being maintained after all the alkali has been added within the aforesaid range of from 40° C. to 90° C. until a constant pH value has been attained.

In a preferred sequence of operations, the substituted imidazoline of Formula II and the quaternizing agent are mixed and brought to a selected temperature of between 40° C. and 90° C., and the pH is monitored by taking samples of the reaction mixture, adjusting the solid content of each to about 10% by addition if necessary of distilled or otherwise deionized water, and measuring the pH of the diluted samples. Alkali is then added to the reaction mixture in such an amount (if any) as is needed until the pH of the sample diluted with deionized water to a 10% total solids content falls within the range of 7 to 9, preferably 7 to 7.5. The alkali is added continuously or intermittently, so as to maintain the pH of the reaction mixture between the specified mildly alkaline limits, until at least 50% of that amount of substituted imidazoline for which there is sufficient quaternizing agent has been quaternized. Where more than one molar proportion of imidazoline is used with one molar proportion of quaternizing agent then, since the substituted imidazoline is itself basic, it may not be necessary to add any alkali so as to maintain the desired pH level. The pH is maintained at the stated level until at least 50% and preferably substantially more of the substituted imidazoline present which can be quaternized, taking into account the amount of quaternizing agent present, has in fact reacted. Thereafter the remainder of the desired alkali is added; in all between 0 and 3.5 molar proportions of alkali are used for each 1 molar proportion of substituted imidazoline, including that added to maintain the pH at the correct level. The reaction mixture is then kept at a temperature of 40° to 90° C. till a constant pH is obtained. It is preferred to react not more than 1 molar proportion of quaternizing agent with 1 molar proportion of the substituted imidazoline, and in such circumstances it is preferred that not more than 1.5 moles of alkali are used when the quaternizing agent is an acid, and not more than 0.5 moles when the quaternizing agent is a salt or sultone.

If substantially complete quaternization is desired, it is necessary to use at least 1 molar proportion of quaternizing agent for each molar proportion of substituted imidazoline. When using equimolar proportions it is preferred to use 1 to 1.5 molar proportions of alkali if a halogen-substituted acid is used as the quaternizing agent, and to use 0 to 0.5 molar proportions of alkali if a halogen-substituted acid salt or sultone is used. However, if it is not desired to obtain the maximum quaternization of the substituted imidazoline (as, for example, may be the case when it is intended to react unquaternized imidazoline in the product of the process further to give the N-oxide in the manner described in our co-pending application Ser. No. 210,545 of even date herewith entitled "Process for Preparing Detergent Compositions") more than 1 molar proportion of imidazoline for each molar proportion of quaternizing agent can be used and as excess tertiary imidazoline is basic then the total amount of alkali used may be decreased or even eliminated altogether.

It is preferred to carry out the reaction at a temperature in the range of from 45° C. to 55° C., especially 55° C.; however, a higher temperature up to 90° C. may be usefully employed for a short period, for example 1 to 4 hours, particularly at the end of the reaction period, to achieve the maximum degree of quaternization.

The substituted tertiary imidazoline used as starting material is preferably one prepared by condensing aminoethyl-ethanolamine with a material selected from the group consisting of lauric acid, coconut oil fatty acid, stripped coconut oil fatty acid from which the $C_8$–$C_{10}$ fraction has been removed, and the methyl and ethyl esters of these fatty acids. However, a wide variety of such substituted tertiary imidazolines may be used, such as those of Formula II above wherein the $R_1$ substituents are any of the following, namely

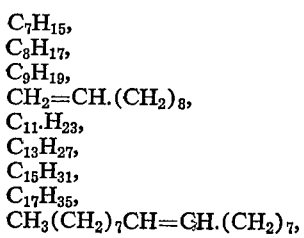

CH₃(CH₂)₇CH(OH).CH(OH).(CH₂)₇,
CH₃(CH₂)₇CH(OH).CH(OH).(CH₂)₇,
CH₃(CH₂)₅CH(OH).CH₂.CH=CH.(CH₂)₇
C₁₉H₃₉, while the —C$_n$H$_{2n}$OH substituent may in each case be

—CH₂.CH₂OH,

—CH₂.CH.OH
       |
       CH₃ or

—(CH₂)₄.OH

The above derivatives may be manufactured in the manner described in U.S. patent specification No. 2,267,-965 (which refers to the compounds as glyoxalidines). The substituted imidazolines can be prepared from naturally-occurring fatty acids, for example caprylic, capric, lauric, myristic, palmitic, stearic, behenic, oleic, linoleic and ricinoleic acids and also various aliphatic acids which may be derived from natural fatty acids, for example dihydroxy-stearic acid, undecylenic acid and pelargonic acid. Other substituted imidazolines suitable for use in the process of the invention are those which may be obtained by reacting fatty acids containing 8 to 22 carbon atoms with an aminoethylethanolamine (i.e. hydroxyethylethylenediamine) or N-(β-hydroxypropyl)propylenediamine in the manner described in U.S. patent specification No. 2,267,965. Mixtures of these imidazolines may also be used, and indeed often the mixtures of substituted imidazolines which are obtainable by reacting naturally-occurring mixtures of fatty acids with the appropriate polyamine will be particularly suitable for the purposes of the invention. Examples of such mixtures of substituted imidazolines are those obtainable by reacting aminoethylethanolamine or N-(β-hydroxypropyl)propylenediamine in the manner of U.S. patent specification No. 2,267,965 with any of the following mixtures of fatty acids; coconut oil fatty acid, palm kernel oil fatty acid, coconut oil fatty acid from which the C₈–C₁₀ fraction has been removed, groundnut oil fatty acid, olive oil fatty acid, safflower oil fatty acid, teaseed oil fatty acid, palm oil fatty acid, linseed oil fatty acid, soya bean oil fatty acid, sperm oil fatty acid, castor oil fatty acid, tallow fatty acid, and fish oil fatty acid, and any of the above natural mixtures which have been partially or fully hydrogenated. Mixtures of fatty acids obtainable synthetically, where the chain lengths of the synthetic fatty acids are such that the major proportion of the imidazoline derivatives produced from the mixture fall within the scope of the formula given for imidazoline derivatives, are also suitable for the process of the invention. Reference has been made to substituted imidazolines being prepared from fatty acids; it is to be understood that other fat derivatives such as fatty acid esters, particularly methyl and ethyl esters, and fatty acid chlorides may be used, under the appropriate conditions.

Preferred halogen-substituted acids for use in the process of the present invention are monochloroacetic acid, α-chloropropionic acid, β-chloropropionic acid, α-bromopropionic acid, monoiodoacetic acid, and α-chloro-β-hydroxy-propionic acid, as well as Cl.CH₂.CH₂.SO₃H, CH₃.CH(Cl).SO₃H, Br.CH₂.CH₂.SO₃H and Cl.CH₂.CH(OH).CH₂.SO₃H, and the sodium and potassium salts of these acids.

Specific preferred sultones for use in the process of the invention are those identifiable by name and structure as follows:

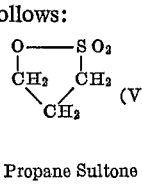 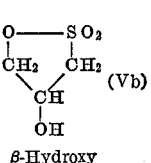 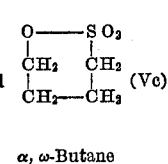

Propane Sultone    β-Hydroxy Propane Sultone    α,ω-Butane Sultone

Naturally, mixtures of various halogenated materials and/or sultones may be employed as the quaternizing agent.

Naturally, the alkali will normally be added to the reaction mixture in the form of an aqueous solution and the preferred solutions for this purpose are those containing from 1% to 50% by weight of the selected alkali.

Under optimum conditions, with a molar ratio of imidazoline to quaternization agent of 1:0.5, almost the stoichiometric amount of quaternized imidazoline should be formed, whilst with a ratio of 1:1 about 75%, and with a ratio of 1:3 even as much as about 97% of the starting material may be quaternized.

The superior degree of quaternization obtainable by the process of this invention is demonstrated by the results set out below, which show the percentage quaternization of a substituted imidazoline mixture which may be represented by the formula

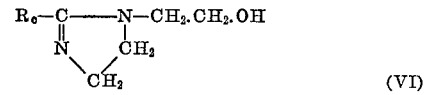 (VI)

(where R$_c$ is the residue R$_c$ of R$_c$.COOH where the latter represents the mixed fatty acids of coconut oil from which the C₈–C₁₀ fraction has been removed) using various molar proportions of mono-chloroacetic acid, secured by the method of the prior art as compared with the percentage quaternization achieved, using the same proportions, when the process of the invention is employed. These results are set out in Table I below as follows:

TABLE I

| Moles of mono-chloroacetic acid per mole of imidazoline | Percentage quaternized at— | |
|---|---|---|
| | pH 7.5 according to this invention | pH 13 according to prior art |
| 1, percent | 76 | 60 |
| 2, percent | 93 | 70 |
| 3, percent | 97 | 78 |

Although a high degree of conversion of the imidazoline derivative to the desired quaternized product is obtainable by using the process of the invention, products obtained by this process may nevertheless contain some unquaternized imidazoline derivatives. Such products containing both quaternized and unquaternized imidazoline derivatives may be treated with hydrogen peroxide or other oxidizing agents to yield useful compositions where the unquaternized material has been converted to a compound containing an N-oxide radical in the manner described and claimed in our aforesaid co-pending Application Ser. No. 210,545 of even date herewith entitled "Process for Preparing Detergent Compositions."

DESCRIPTION OF PREFERRED EMBODIMENTS

In order that this invention may be better understood, the following examples are now given, though by way of illustration only, to show details of particularly preferred reagents, techniques and conditions used in the process of this invention. It should be noted that all the pH measurements were carried out electrometrically in a solution adjusted to a 10%-solids content.

EXAMPLE 1

A solution of 94.5 kg. (1 kmol) of mono-chloroacetic acid in 300 kg. of water was placed in a retort fitted with an agitator, and mixed with 268 kg. (1 kmol) of 1-hydroxyethyl-2-undecyl-imidazoline. Sufficient caustic soda was added to the mixture to establish and maintain a constant pH of 7.0–7.5, and the mixture was left to agitate at 55° C. At intervals, further caustic soda was added to ensure that a pH of 7.0–7.5 was maintained in the reaction mixture.

After 24 hours, the remaining caustic soda was added; the overall quantity of caustic soda added in total amounted to 40 kg. (1 kmol). The mixture was thereafter left once more to agitate until it attained a constant pH of 8.0–8.4.

Analysis of the aqueous solution showed that 76% of the 1-hydroxyethyl-2-undecyl-imidazoline had been converted to the desired amphoteric derivative, presumed to be of the formula:

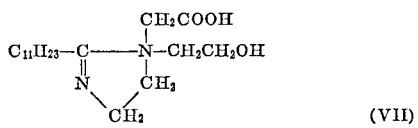
(VII)

If, in the above process, the 268 kg. of 1-hydroxyethyl-2-undecyl-imidazoline is replaced by:

212 kg. (1 kmol) of 1-hydroxyethyl-2-heptyl-imidazoline
226 kg. (1 kmol) of 1-hydroxyethyl-2-octyl-imidazoline
240 kg. (1 kmol) of 1-hydroxyethyl-2-nonyl-imidazoline
296 kg. (1 kmol) of 1-hydroxyethyl-2-tridecyl-imidazoline
324 kg. (1 kmol) of 1-hydroxyethyl-2-pentadecyl-imidazoline
352 kg. (1 kmol) of 1-hydroxyethyl-2-heptadecyl-imidazoline
380 kg. (1 kmol) of 1-hydroxyethyl-2-nondecyl-imidazoline
252 kg. (1 kmol) of 1-hydroxyethyl-2-(dec-9'-enyl)-imidazoline
350 kg. (1 kmol) of 1-hydroxyethyl-2-(heptadec-8'-enyl)-imidazoline
368 kg. (1 kmol) of 1-hydroxyethyl-2-(9'-hydroxy-heptadecyl)-imidazoline
384 kg. (1 kmol) of 1-hydroxyethyl-2-(8',9'-dihydroxy-heptadecyl)-imidazoline
366 kg. (1 kmol) of 1-hydroxyethyl-2-(11'-hydroxy-heptadec-8'-enyl)-imidazoline, then the corresponding amphoteric derivatives are, in each case, obtained in high yield.

EXAMPLE 2

A solution of 195.5 kg. (1 kmol) of sodium 2-hydroxy-3-chloro-propane-sulfonate in 452 kg. of water was placed in a retort fitted with an agitator, and mixed with 268 kg. (1 kmol) of 1-hydroxyethyl-2-undecylimidazoline. Sufficient caustic soda was added to establish and maintain a constant pH of 7.0–7.5 in the reaction mixture. The mixture was left to agitate at 55° C., and at intervals further caustic soda was added to ensure that a pH of 7.0–7.5 was maintained in the reaction mixture.

After 24 hours the remaining caustic soda was added; the overall quantity of caustic soda added in total amounted to 20 kg. (0.5 kmol). Thereafter, the solution was again left to agitate until a constant pH value of about 8.2 was attained.

Analysis of the aqueous solution showed that 80% of the 1-hydroxyethyl-2-undecylimidazoline had been converted to the desired amphoteric derivative presumed to be of the formula:

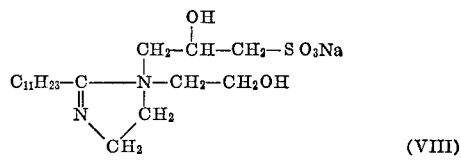
(VIII)

The same results are secured when the caustic soda is replaced by the corresponding molecular quantity of caustic potash or lithium hydroxide.

Also, the process can be operated to give similar though less good yields at higher pH values around 8.5, and at temperatures in the region of 75° C.–85° C.

EXAMPLE 3

A solution of 66.1 kg. (0.7 kmol) of mono-chloroacetic acid in 300 kg. of water was placed in a retort fitted with an agitator, and mixed with 268 kg. (1 kmol) of 1-hydroxyethyl-2-undecyl-imidazoline. The mixture was left to agitate for 15 hours at 55° C., and then heated to 90° C. and agitated for a further 2 hours. Analysis of the aqueous solution showed that 67% of the added 1-hydroxyethyl-2-undecyl-imidazoline had been converted to the desired amphoteric derivative, which is the same as that prepared in Example 1.

If, in the above process, the 268 kg. of 1-hydroxyethyl-2-undecyl-imidazoline is replaced by 296 kg. (1 kmol) of 1-(4'-hydroxy-butyl)-2-undecyl-imidazoline or 282 kg. (1 kmol) of 1 - (2'-hydroxy-propyl)-2-undecyl-imidazoline, then the corresponding amphoteric derivatives are, in each case, obtained in high yield relative to the amount of quaternizing agent used.

We claim:

1. A process for the preparation of amphoteric quaternary imidazoline derivatives, useful as surface-active agents,
in which a tertiary amine selected from the group consisting of substituted tertiary imidazolines and mixtures thereof,
said substituted tertiary imidazolines being those which are represented by the formula

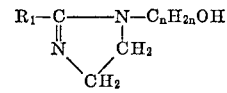

(wherein $R_1$ is a radical selected from the group consisting of hydrocarbon, monohydroxy-substituted hydrocarbon and dihydroxy-substituted hydrocarbon radicals, all containing from 7 to 21 carbon atoms, while $n$ is an integer of from 2 to 4),
is reacted with a quaternizing agent selected from the group consisting of halogenated materials and sultones and mixtures thereof,
said halogenated materials consisting of the group of halogenated acids represented by the formula $$C_mH_{2m-p}(OH)_p(Z)X$$

(where $m$ is an integer of from 1 to 3, $p$ is selected from the group consisting of zero and integers from 1 to the value of $m$, $Z$ is a halogen selected from the group consisting of Cl, Br and I, and X is an acid function selected from the group consisting of $SO_3H$ and COOH)
and the sodium, potassium, lithium, magnesium, calcium, aluminum and zinc salts of said acids,
and said sultones being selected from the group consisiting of compounds represented by the formulae

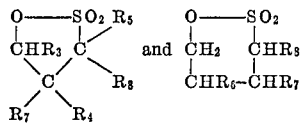

(wherein one of the substituents $R_3$, $R_4$ and $R_5$ is selected from the group consisting of H and $CH_3$, and the other two said substituents are H, while the substituents $R_6$, $R_7$ and $R_8$ are each selected from the group consisting of H and OH),
said reaction being effected in aqueous solution
between 1 molar proportion of said substittued imidazoline and 0.3 to 3.0 molar proportions of said quaternizing agent,
at a temperature of between 40° C. and 90° C.,
with addition of from 0 to 3.5 molar proportions of an alkali selected from the group consisting of sodium hydroxide, potassium hydroxide, lithium hydroxide and mixtures thereof,
the addition of alkali from the outset being so controlled that the pH of the reaction mixture remains at a value such that samples thereof diluted with deionized water to bring the total solids content thereof to substantially 10% have a pH within the range of from 7 to 9, said control of the alkali addition being continued until at least 50% of that amount of said imidazoline derivative present to react with which there is sufficient quaternizing agent has been quaternized, the temperature being maintained within the aforesaid range of from 40° to 90° C. after addition of all the alkali until a substantially constant pH value has been attained.

2. A process according to claim 1, wherein the reaction is effected at a temperature within the range of from 45° to 55° C.

3. A process according to claim 1, wherein the pH of the reaction mixture is maintained such that the pH of the samples is within the range of from 7 to 7.5.

4. A process according to claim 2, wherein the pH of the reaction mixture is maintained such that the pH of the samples is within the range of from 7 to 7.5.

5. A process according to claim 1, wherein the substituted tertiary imidazoline is prepared by condensing aminoethyl-ethanolamine with a material selected from the group consisting of lauric acid, coconut oil fatty acid, stripped coconut oil fatty acid from which the $C_8$–$C_{10}$ fraction has been removed, and the methyl and ethyl esters of these fatty acids.

6. A process according to claim 1, in which the quaternizing agent employed is a halogenated material selected from the group consisting of halogenated acids represented by the formula $$C_mH_{2m-p}(OH)_p(Z)X$$

(wherein $m$ is as defined in claim 1 and $p$ is selected from the group of 0 and 1) and the sodium and potassium salts of these acids.

7. A process according to claim 6, in which the quaternizing agent employed is one selected from the group consisting of monochloroacetic acid, α-chloropropionic acid, β - chloropropionic acid, α - bromopropionic acid, monoiodoacetic acid, α - chloro-β-hydroxypropionic acid and the corresponding sulfonic acids and the sodium and potassium salts of all these acids.

8. A process according to claim 1, in which the quaternizing agent is a sultone selected from the group consisting of propane-sultone, β-hydroxy-propane-sultone and α,ω-butane-sultone.

References Cited

UNITED STATES PATENTS

| | | | |
|---|---|---|---|
| 2,528,378 | 10/1950 | Mannheimer | 260—309.6 |
| 2,528,379 | 10/1950 | Mannheimer | 260—309.6 |
| 2,528,380 | 10/1950 | Mannheimer | 260—309.6 |
| 2,982,651 | 5/1961 | Mackey | 96—87 |
| 3,231,580 | 1/1966 | Mannheimer | 260—309.6 |
| 3,231,581 | 1/1966 | Mannheimer | 260—309.6 |
| 3,359,275 | 12/1967 | Mannheimer | 260—309.6 |
| 3,408,361 | 10/1968 | Mannheimer | 260—309.6 |
| 3,522,175 | 7/1970 | Katsumi et al. | 252—8.8 |
| 3,625,859 | 12/1971 | Hashimoto et al. | 252—392 |

HENRY R. JILES, Primary Examiner

G. THOMAS TODD, Assistant Examiner